UNITED STATES PATENT OFFICE.

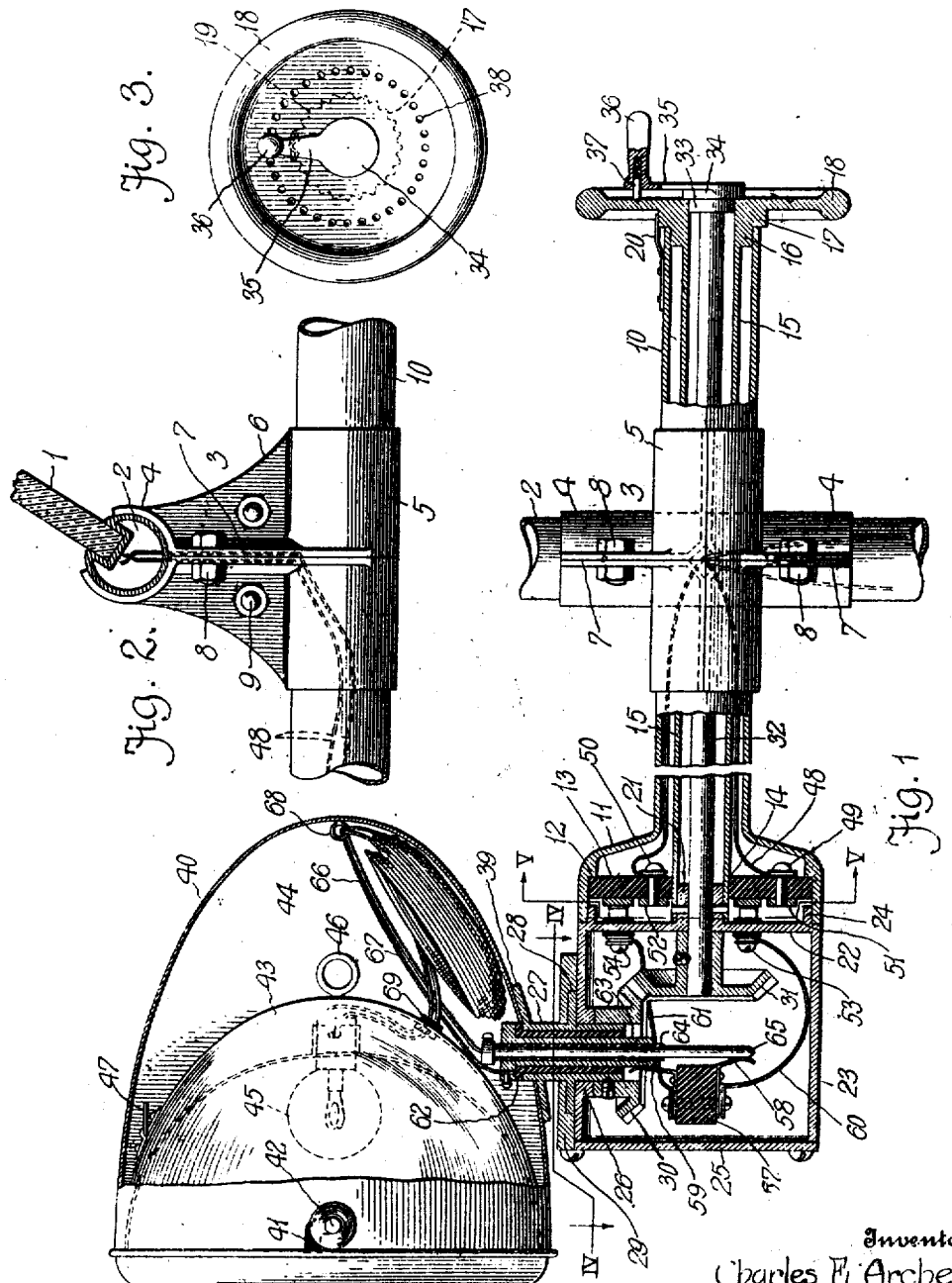

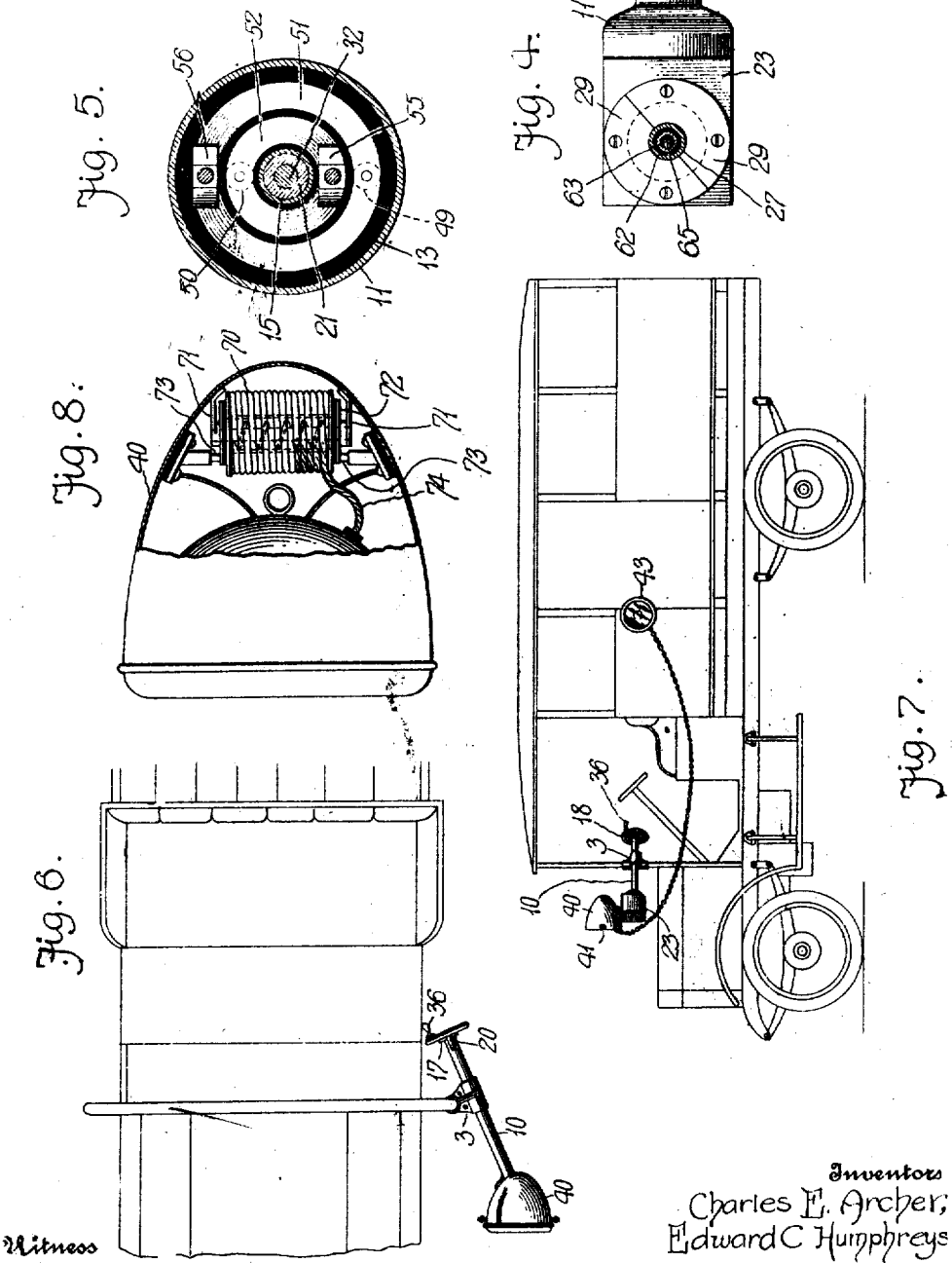

EDWARD C. HUMPHREYS AND CHARLES E. ARCHER, OF DETROIT, MICHIGAN.

DIRIGIBLE HEADLIGHT.

1,259,867.   Specification of Letters Patent.   Patented Mar. 19, 1918.

Application filed November 1, 1916. Serial No. 128,866.

*To all whom it may concern:*

Be it known that we, EDWARD C. HUMPHREYS and CHARLES E. ARCHER, citizens of the United States of America, residing at Detroit, in the county of Wayne and State of Michigan, have invented certain new and useful Improvements in Dirigible Headlights, of which the following is a specification, reference being had therein to the accompanying drawings.

This invention relates to dirigible headlights and more particularly to that type of headlight commonly styled a "spot light," adapted for mounting on the windshield or a suitable support of an automobile, to be manually manipulated from the driver's seat so as to cast a ray of light ahead of the automobile or vehicle and in any desired direction.

Our invention aims to provide a dirigible headlight that may be easily swung about a horizontal axis or rotated about a vertical axis, thus providing adjustment in two directions which permits of the chauffeur of an automobile or driver of any vehicle directing rays of light in a desired direction or wigwagging the headlight for signal purposes. To accomplish such adjustments, a headlight is provided with novel supports including mechanisms operable independent of each other or in synchronism and during such adjustment provision is made for conducting electrical energy to an incandescent lamp forming part of the headlight.

Our invention further aims to provide a dirigible headlight casing to which a conventional form of spot light or a specially designed headlight may be detachably mounted with sufficient cable that may be stored on an automatic reel to permit of the headlight being removed from the casing and used at a remote point. For instance, considering the dirigible headlight casing as carried by the windshield of an automobile, it is possible to remove the headlight and carry the same to the rear part of the automobile to afford illumination and facilitate repairs or observations at night.

Our invention further aims to accomplish the above and other results by a mechanical construction which will be hereinafter specifically described and then claimed, and reference will now be had to the drawings, wherein—

Figure 1 is a side elevation of a dirigible headlight, partly broken away and partly in section;

Fig. 2 is a plan of a windshield bracket;

Fig. 3 is an end view of a portion of the dirigible headlight operating mechanism;

Fig. 4 is a horizontal sectional view taken on the line IV—IV of Fig. 1;

Fig. 5 is a cross sectional view taken on the line V—V of Fig. 1;

Fig. 6 is a plan of a dirigible headlight, as applied to a windshield or other support of a vehicle;

Fig. 7 is a side elevation of the same, showing the headlight proper removed from the casing and suspended at one side of the vehicle, and Fig. 8 is a detail view of an automatic cable reel.

In describing my invention by aid of the views above referred to, I desire to point out that the same are intended as merely illustrative of the dirigible headlight as now constructed, and I do not care to confine myself to the precise construction and arrangement of parts shown. The following description is therefore to be broadly construed as including such substitute constructions and arrangements of parts which are the obvious equivalents of those to be hereinafter referred to.

In the drawings, 1 denotes a portion of a windshield having a frame 2 and clamped thereon and capable of lateral adjustment about the vertical axis of the frame 2 is a bracket generally designated 3. This bracket is preferably made of a plurality of parts including frame clamping portions 4, arm clamping portions 5 and webs 6 and 7 connecting the portions 4 and 5 and adding rigidity to the bracket. Fastening means 8 in connection with the web 7 permit of the bracket being adjusted relative to the windshield frame 2 and fastening means 9 in connection with the web 6 permits of a tubular arm 10 being firmly held by the clamping portions 5 of the bracket. My invention is not necessarily limited to this specific type of bracket, although it is preferable to use the same since lateral adjustment may be obtained that permits of the arm 10 being positioned at a desired angle relative to the windshield.

The tubular arm 10 has the outer end thereof terminating in a hollow cup shaped head 11 provided with an annular interior seat 12 for a disk 13 of insulation material. This disk has a concentric opening 14 and extending therethrough and longitudinally of the arm 10 is a tubular shaft 15 which has the inner end thereof provided with stepped annular shoulders 16 and 17 forming the hub portion of a hand wheel 18. The annular shoulder 16 is journaled in the inner end of the tubular arm 10, with the shoulder 17 abutting the end of said arm, and the periphery of the shoulder 17 is toothed or notched, as at 19, to be engaged by a flat resilient spring 20, carried by the inner end of the arm 10. This spring constitutes means for preventing accidental rotation of the tubular shaft 15 within the tubular arm 10.

The outer end of the tubular shaft 15 is mounted on and secured to an apertured boss 21 carried by the rear wall 22 of a housing 23. The rear wall 22 of the housing has an annular flange 24 extending into the head 11 of the tubular arm 10 and adapted for rotation therein when the housing 23 is rotated about the axis of the tubular arm 10 by rotating the hand wheel 18. The housing 23 has a detachable front wall 25 so that access may be had to the interior of the housing, and the top wall of the housing has an apertured bearing 26 for a rotatable tubular shaft 27, said shaft having a peripheral flange or collar 28 resting upon the top of the housing 23 and held against vertical displacement by a retaining plate 29 made in two sections and suitably connected to the housing, as shown in Fig. 4.

Mounted on the lower or inner end of the tubular shaft 27 is the hub of a beveled gear wheel 30, said beveled gear wheel meshing with a beveled gear wheel 31 mounted on the end of a solid shaft or rod 32 extending through the apertured boss 21 into the housing 23. The solid shaft or rod 32 is concentric of the tubular shaft 15. The inner end of said rod has annular stepped shoulders 33 and 34, the former being journaled in the hub portion of the hand wheel 18 and the latter abutting the hub portion of the hand wheel to coöperate with the beveled gear wheel 31 in preventing longitudinal displacement of the rod 32 relative to the tubular shaft 15. The annular shoulder 34 of the rod 32 has a crank 35 and a handle 36 and said handle is provided with a spring pressed detent 37 adapted to engage in notches or sockets 38 provided therefor in the outer face of the hand wheel 18. The spring pressed detent 37 constitutes means for holding the rod 32 against accidental rotation in the tubular shaft 15, consequently the tubular shaft 27 is held against accidental rotation or until such time as said shaft is rotated by swinging the crank 35 relative to the hand wheel 18.

The upper or outer end of the tubular shaft 27 is provided with a seat 39 for a headlight casing 40 somewhat paraboliform. The headlight casing is fixed on the seat 39 for rotative continuity with the shaft 27 and said casing has diametrically opposed walls thereof, at the open end thereof, provided with bayonet shaped slots 41 adapted to receive pins 42 carried by a headlight 43 mounted in the open end of the casing 40. The slots 41 and the pins 42 constitute means for detachably holding the headlight relative to its casing, and said headlight is also somewhat paraboliform, but of less length than the casing 40, to afford a storage compartment 44 in the inner end of the casing. The headlight 43 is of the reflector type and has as its illuminating medium an incandescent electric lamp 45. In order that the headlight may be suspended from a suitable support, when removed from the casing 40, the shell of the headlight has eyes 46 and 47, one adapted for supporting the headlight to cast its beam downwardly and the other for supporting the headlight to cast its beam in a lateral plane.

Reference will now be had to the manner of conducting an electric current to the lamp 45 of the headlight, so that the same may be illuminated during adjustments thereof. The source of electrical energy, as batteries, has not been shown, but lead wires 48 from the source of electrical energy are adapted to extend through the windshield frame 2 and through portions of the brackets 3 into the tubular arm 10. This is a preferable arrangement to protect the lead wires and at the same time enhance the general appearances of the dirigible headlight. The lead wires 48 are carried into the head 11 of the tubular arm 10 and connected to binding posts 49 and 50 of the disk 13. On the opposite face of the disk of insulation 13 there are concentric contact rings 51 and 52, with the binding posts 49 and 50 connected thereto. The rear wall 22 of the housing 23 has binding posts 53 and 54 and these binding posts are provided with contact fingers or brushes 55 and 56 respectively, normally engaging the contact rings 52 and 51.

Arranged transversely of the housing 23 is a support 57 of insulation material and mounted on said support are contact members 58 and 59. The contact member 58 is connected by a wire 60 to the binding post 53 and the contact member 59 is connected by a wire 61 to the binding post 54, said wires being arranged so as not to interfere with the operaton of beveled gear wheels 30 and 31.

Mounted in the tubular vertical shaft 27 is a bushing 62 of insulation and in the bushing 62 is a metallic sleeve 63 having the lower end thereof extending from the beveled gear wheel 30 to be engaged by the contact member 59. In metallic sleeve 63 is a bushing 64 of insulation and mounted in said bushing is a rod 65, said rod having the lower end thereof normally engaged by the contact member 58. A cable 66 connects the upper end of the metallic sleeve 63 with the incandescent lamp 45 and another cable 67 connects said lamp with the upper end of the rod 65.

The cables 66 and 67 pass through an eye 68 in the headlight casing and said cables are of sufficient length to permit of the headlight 43 being detached and carried to a remote point or to the side of an automobile or vehicle, as shown in Fig. 7. The cables 66 and 67 are adapted to be coiled within the storage compartment 44, and said cables pass through a suitable insulator 69 carried by the shell of the headlight 43.

In Fig. 8 there is shown an automatic reel which we may use in connection with the casing 40. The reel is designated 70 and is spring actuated in one direction similar to the operation of a curtain shade roller. Brackets 71 support the reel and at the ends thereof are contact rings 72 for brushes 73, carried by the casing 40 and electrically connected as in the other arrangement. The headlight proper has a cable 74 wound on the reel and connected to the contact rings 72. The reel provides an automatic take up device for the headlight cable and facilitates handling the headlight proper relative to the casing.

The operation, a partial rotation of the hand wheel 18 in either direction causes the spring 20 to recede over the teeth 19 of the hub of the hand wheel and imparts a rotary movement to the hollow shaft 15. As the shaft is rotated the housing 23 is swung relative to the head 11 of the hollow arm 10. Since the rod 32 is supported by the housing and the tubular shaft 15 and held by the detent 37, the rod 32 will also be turned with the tubular shaft 15 and the beveled gear wheels 30 and 31 will remain stationary relative to each other, consequently the housing 23 is bodily swung about the longitudinal axis of the tubular arm 10 and the headlight casing 40 tilted to one side or the other. During this operation, the contact fingers or brushes 55 and 56 wipe the contact rings 51 and 52 and thereby maintain an electric circuit in connection with the lamp 45.

When it is desired to swing the headlight casing 40 in a horizontal plane and thus turn the headlight 43 to the right or to the left, the hand wheel 18 is left alone and the rod 32 actuated through the medium of the handle 36. In this instance, the housing 23 remains stationary and the gear wheel 31 imparts a rotary movement to the vertical tubular shaft 27, which in turn shifts the headlight casing 40 in a desired direction. During this operation an electric circuit is maintained in connection with the incandescent lamp 45 through the medium of the contact members 58 and 59 engaging the rod 65 and the sleeve 63 respectively. It is also to be noted that during this last mentioned operation that the flange or collar 28 of the vertical tubular shaft 27 supports the headlight casing and headlight relative to the housing 23, thereby relieving the beveled gear wheel 31 and appurtenant parts of stresses and strains, other than the frictional contact with the beveled gear wheel 30.

The headlight may be used in connection with any vehicle provided with a source of electrical energy, and as illustrating a distinct advantage in connection with the headlight, there is shown in Figs. 6 and 7 a delivery truck. The bracket 3 is placed at a height on the windshield or front of the truck body convenient to a seat for the chauffeur and the tubular arm 10 is placed at an angle that will position the hand wheel 18 in proximity to the steering post or column of the truck whereby a chauffeur can easily and quickly manipulate the hand wheel 18 of the handle 36, without neglecting the steering wheel. Furthermore, the angularity of the tubular arm 10 so positions the headlight as will permit of turning same in any direction without meeting interference from any part of the vehicle. Since merchandise is often delivered at night and addresses or delivery instructions must be observed, the advantage of having the headlight proper detachable relative to the casing is immediately apparent. The connection between the headlight and the casing is such that the headlight can be easily and quickly detached and carried to either side or to the rear portion of the truck for the convenient use of the chauffeur. The eyes 46 and 47 permit of the headlight being suspended inside of the truck or outside thereof, and as a matter of fact, light may be directed on any part of the truck when repairs are to be made at night. We attach considerable importance to this feature of our invention, as we have combined a portable headlight with a dirigible casing therefor, and during the various uses positive and reliable electrical connections are established which will readily withstand vibrations incurred by pleasure and commercial vehicles encountering rough roads or streets.

What we claim is:

1. In a dirigible headlight, an arm adapted for attachment to a vehicle, concentric shafts in said arm, a housing connected to one of said shafts to be adjusted thereby, an electric headlight on said housing, a gear transmission between said housing and the other shaft so that said electric headlight may be adjusted by said shaft, and electric conductors extending through said arm adapted to supply current to said electric headlight.

2. In a dirigible headlight, an arm adapted for attachment to a vehicle, concentric shafts in said arm, a housing connected to one of said shafts to be adjusted thereby, a headlight on said housing, a gear transmission between said housing and the other shaft so that said casing may be adjusted by said shaft, cables connected to said headlight, lead-in wires in said arm, and means in said housing establishing electrical connections between said cables and said lead-in wires.

3. In a dirigible headlight, a stationary arm, contact rings carried thereby, an adjustable housing carried by said arm, contact brushes carried by said housing engaging said contact rings, a headlight carried by said housing, contact members in said housing electrically connected to said contact brushes, and means electrically connecting said headlight to said contact members.

In testimony whereof we affix our signatures in presence of two witnesses.

EDWARD C. HUMPHREYS.
CHARLES E. ARCHER.

Witnesses:
KARL H. BUTLER,
ANNA M. DORR.